US007866162B2

(12) United States Patent
Blanchard et al.

(10) Patent No.: US 7,866,162 B2

(45) Date of Patent: Jan. 11, 2011

(54) EXHAUST CONE FOR CHANNELING A STREAM OF GAS DOWNSTREAM FROM A TURBINE

(75) Inventors: Stephane Pierre Guillaume Blanchard, Chartrettes (FR); Laurent Bernard Cameriano, Avon (FR); Mathieu Dakowski, Sucy En Brie (FR); Alain Pierre Page, Montgeron (FR)

(73) Assignee: Snecma, Paris (FR)

(*) Notice: Subject to any disclaimer, the term of this patent is extended or adjusted under 35 U.S.C. 154(b) by 825 days.

(21) Appl. No.: 11/765,173

(22) Filed: Jun. 19, 2007

(65) Prior Publication Data

US 2008/0104941 A1 May 8, 2008

(30) Foreign Application Priority Data

Jun. 26, 2006 (FR) .................................. 06 52641

(51) Int. Cl.
*F02C 7/20* (2006.01)

(52) U.S. Cl. .................................... 60/796; 239/265.11

(58) Field of Classification Search ................ 60/226.1, 60/262, 263, 770, 796, 761; 181/213, 284, 181/292, 293; 239/265.11; 415/115
See application file for complete search history.

(56) References Cited

U.S. PATENT DOCUMENTS 2,570,591 A * 10/1951 Price .......................... 60/241
2,799,472 A * 7/1957 Rainbow .................... 415/136
2,828,603 A * 4/1958 Laucher ...................... 60/761
4,064,961 A * 12/1977 Tseo .......................... 181/213
4,189,939 A * 2/1980 West et al. ............... 73/116.03
4,196,856 A * 4/1980 James ................... 239/265.39
4,244,441 A * 1/1981 Tolman ...................... 181/213
4,452,038 A * 6/1984 Soligny ...................... 60/796
4,802,629 A * 2/1989 Klees ................... 239/265.19
4,909,346 A * 3/1990 Torkelson .................. 181/213
5,230,214 A 7/1993 Pechette
2007/0256889 A1* 11/2007 Yu et al. .................... 181/214
2008/0110178 A1* 5/2008 Lefebvre et al. ............. 60/783

FOREIGN PATENT DOCUMENTS

| | | |
|---|---|---|
| EP | 0 080 404 A1 | 6/1983 |
| EP | 0 316 233 A1 | 5/1989 |
| EP | 1 557 553 A1 | 7/2005 |
| GB | 739300 | 10/1955 |
| WO | WO 2006/060006 A1 | 6/2006 |

* cited by examiner

*Primary Examiner*—William H Rodríguez
*Assistant Examiner*—Phutthiwat Wongwian
(74) *Attorney, Agent, or Firm*—Oblon, Spivak, McClelland, Maier & Neustadt, L.L.P.

(57) ABSTRACT

An exhaust cone of composite material. The exhaust cone is mounted to extend an adapter ring and it is held by an elastically deformable element that acts axially.

10 Claims, 2 Drawing Sheets

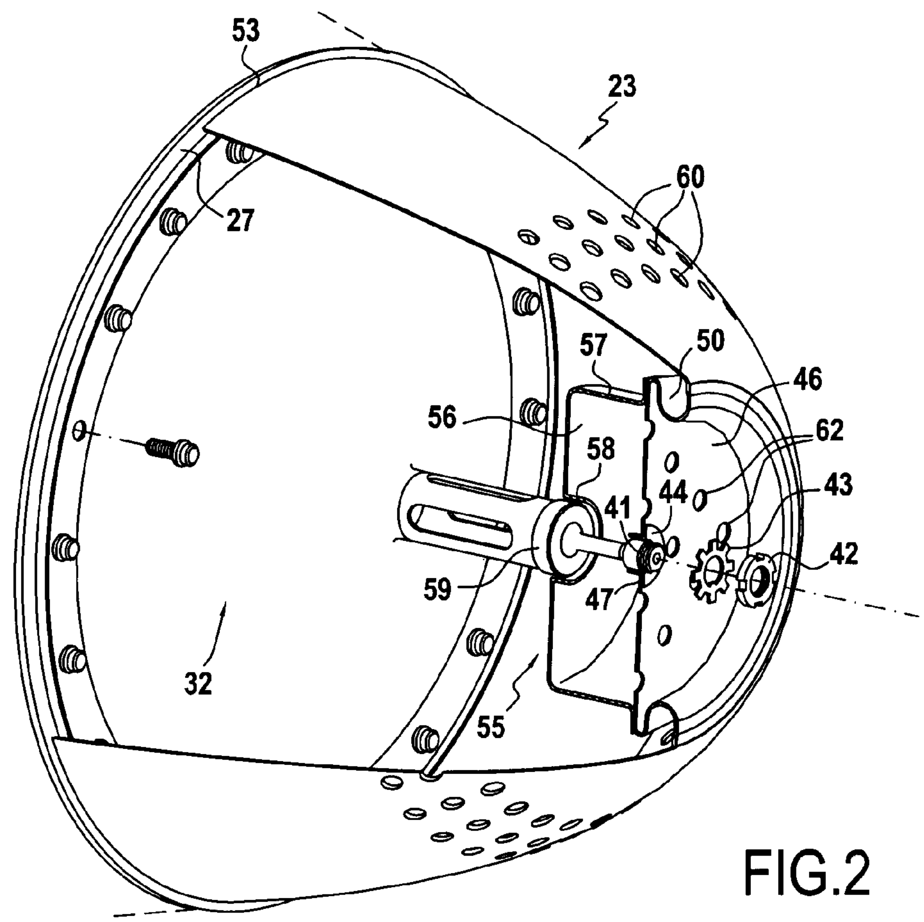
FIG.2
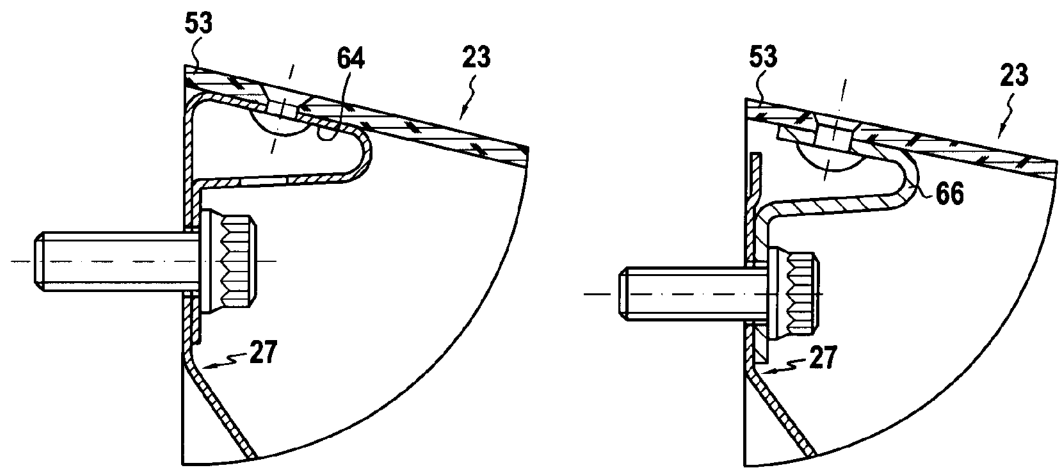
FIG.4
FIG.5

EXHAUST CONE FOR CHANNELING A STREAM OF GAS DOWNSTREAM FROM A TURBINE

The invention relates to a system for channeling the stream of gas downstream from a turbine, and more particularly the high pressure turbine of an airplane engine. It applies for example to an afterbody provided with a so-called "exhaust cone" element defining the inside of the stream, between the outlet from the high pressure turbine and the post-combustion injectors. The invention relates more particularly to mounting such an exhaust cone when it is made of composite material, such as for example a ceramic matrix composite material commonly referred by the abbreviation CMC.

In the present description, the terms "upstream" and "downstream" are used to situate elements of the structure relative to one another relative to the flow direction of the gas.

BACKGROUND OF THE INVENTION

In an airplane turbojet, for example, the afterbody extending radially inside the high pressure turbine and downstream therefrom can be provided with a stream-shaping element that is known as an exhaust cone, which element extends axially between the high pressure turbine and the post-combustion injectors. The element channels the annular stream internally as far as the injector arms for post-combustion. It is also arranged to combat unwanted vibration (known as "screech") by having series of holes formed in its downstream portion.

As a general rule, that element is made of metal and at its downstream end it includes a circular opening having a kind of reentrant cover engaged therein, which cover is likewise made of metal. The assembly is advantageously arranged to contribute to attenuating the above-mentioned vibrations, and in particular to preventing resonance phenomena from forming.

In operation, such an exhaust cone is raised to high temperatures and it is subjected to a temperature gradient over its upstream portion. This gives rise to radial and axial expansions that are absorbed by the flexibility of the various assembled-together parts. The equilibrium point of these expansions leads to high levels of stress which, in combination with the high temperature, shorten the lifetime of the exhaust cone.

To increase its lifetime, attempts have been made in particular to fit an exhaust cone that is made out of composite material, and in particular out of CMC. That solution is advantageous, not only because it increases lifetime, but also because it obtains a reduction in weight. Nevertheless, since the coefficient of expansion of a CMC material is much less than that of a metal, that kind of assembly is difficult to implement.

OBJECTS AND SUMMARY OF THE INVENTION

The invention enables this difficulty to be overcome.

More particularly, the invention provides a channeling system for channeling an annular gas stream downstream from a turbine, the system being of the type including an element known as an "exhaust cone" defining the inside of said stream, said exhaust cone being mounted in such a manner that its axis of symmetry coincides with that of said stream, wherein said exhaust cone is made of composite material, and wherein it is mounted to extend an adapter ring and is held at least in part by resilient stress means acting axially on said exhaust cone, urging it towards said adapter ring, and wherein said exhaust cone includes a downstream circular opening centered on the axis, and the resilient stress means comprise a support secured to said adapter ring and including an axial rod having its downstream end assembled to an elastically deformable element that is axially deformable and that presents an annular hook bearing against an edge of said circular opening.

For example, said downstream end of said axial rod is provided with a threaded portion on which an adjustment nut is screwed that co-operates with a central portion of the elastically deformable element. This makes it possible to adjust the axial stress that is applied to said exhaust cone.

Thus, radial expansions are compensated by creating radial clearance between the inside diameter of the upstream end of the exhaust cone (when cold) and the outside diameter of the adapter ring. The minimum radial clearance between these diameters (when cold) corresponds to the maximum travel that results from the expansion difference between the two parts when hot.

Furthermore, the axial expansion is taken up by the deformation of said elastically deformable element. Its shape enables a large amount of deformation to occur while remaining in the elastic domain. The element is put under stress by tightening the nut. The extent to which the nut is tightened corresponds to a displacement value that is calculated as a function of the maximum difference in axial expansion between the metal and the CMC.

In an advantageous embodiment, the elastically deformable element comprises a disk having a central hole in which said threaded portion is engaged, and a peripheral bellows extended by said annular hook.

The deformable element made of metal thus constitutes the equivalent of the rear cover in the known system. It can be adapted to contribute to combating vibration. To do this, said elastically deformable element is finished off by a reentrant cover including a wall that is perpendicular to said axis, and that is extended by an outer cylindrical portion that is assembled to the elastically deformable element in the vicinity of said bellows. To combat vibration and possible resonance phenomena, the wall of the disk of the elastically deformable element and/or an annular band of said exhaust cone, adjacent to said cylindrical portion, are provided with a plurality of holes.

At the upstream end, the assembly between the cone and the ring can take advantage of the axial stress that is created and adjusted by the adjustment nut. For example, an upstream edge of said exhaust cone is mounted to bear against a collar of said adapter ring.

In a variant, the upstream edge of said exhaust cone is assembled to said adapter ring by a plurality of tabs.

In yet another possible variant, the upstream edge of said exhaust cone is assembled to said adapter ring via an annular bellows. The tabs or the bellows are advantageously made of metal.

The invention also provides a turbomachine fitted with a channeling system as defined above.

BRIEF DESCRIPTION OF THE DRAWINGS

The invention can be better understood and other advantages thereof appear more clearly in the light of the following description given purely by way of example and made with reference to the accompanying drawings, in which:

FIG. 2 is a fragmentary view in perspective showing a variant of the exhaust cone;

FIG. 4 is a detail view showing a variant assembly between the exhaust cone and an adapter ring; and FIG. 5 shows yet another variant of said assembly.

MORE DETAILED DESCRIPTION

Figure 1:
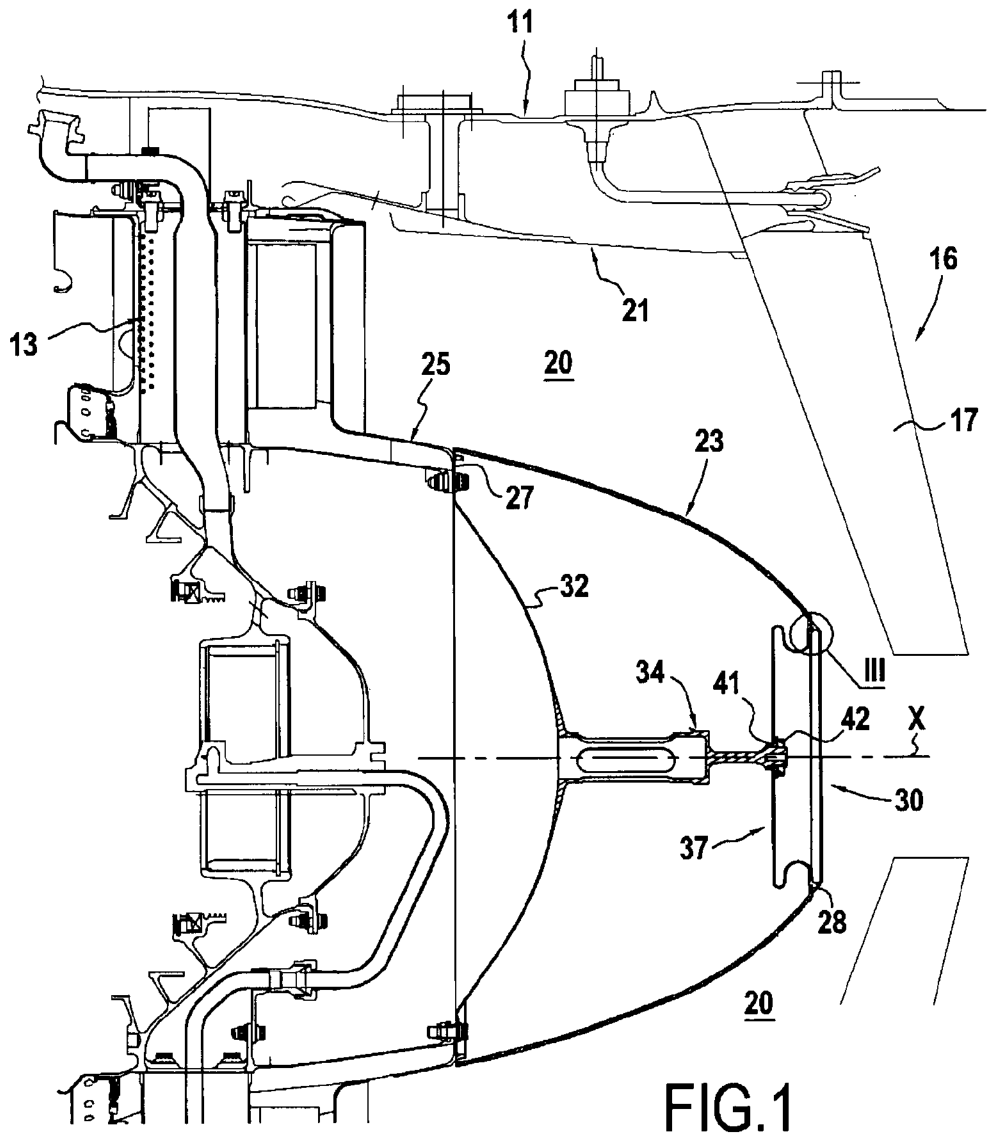
FIG. 1 is a fragmentary and diagrammatic section view of a portion of an airplane engine including an exhaust cone in accordance with the invention.

In FIG. 1, there can be seen a portion of an airplane engine comprising, in an outer casing 11, a high pressure turbine 13 having its rotor driven in rotation about an axis X, and post-combustion injector means 16 disposed downstream from the turbine.

Figure 3:
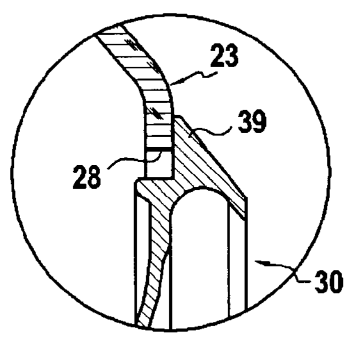
FIG. 3 is a larger-scale view showing detail III of FIG. 1.

Between the turbine 13 and the post-combustion arms 17, the annular gas stream 20 is defined externally by wall elements 21 of the casing, and internally by a streamlined and generally dome-shaped element, commonly referred to an exhaust cone 23. This element is mounted so that its axis of symmetry coincides with that of the stream 20, which is also the axis X of the turbine 13. Various ways of mounting the exhaust cone are shown in FIGS. 1 to 3.

According to an important characteristic of the invention, the exhaust cone 23 is made of composite material, e.g. of reinforced composite material.

Advantageously, it is a ceramic matrix composite material known as CMC.

In addition, a stationary structure 25 that extends radially inside the turbine and that includes in particular bearings for the shaft that is coupled to the rotor of the turbine, includes an adapter ring 27 at its downstream end. The axis of this ring coincides with the axis X. The term adapter ring is used to mean any peripheral support secured to the stationary structure 25 to which the upstream end of circular outline of said exhaust cone is attached in one manner or another.

The exhaust cone 23 is mounted to extend said adapter ring and it is held at least in part by elastic stress means 30 acting axially on said exhaust cone, urging it towards said adapter ring.

The exhaust cone 23 in this example has a circular downstream opening 28 centered on the axis, and in the examples described, said elastic stress means 30 comprise a support 32 secured to the adapter ring 27 (e.g. made integrally therewith as in this example) having an axial rod 34 with its downstream end assembled to an element 37 that is elastically deformable in an axial direction.

This element presents an annular hook 39 bearing against an edge of the circular opening 28.

More precisely, said downstream end of the rod is provided with a threaded portion 41 on which an adjustment nut 42 is screwed that co-operates with a central portion of the elastically deformable element 37 via a clamping washer 43 and a slider ring 44. Consequently, by tightening the nut 42 on said threaded portion 41, it is possible to adjust the axial stress applied to the exhaust 23 whose opposite edge rests against said adapter ring 27.

More precisely, the elastically deformable element 37 in this example comprises a disk 46 provided with a central hole 47 in which said threaded portion 41 is engaged together with the slider ring 44. It also includes a peripheral bellows 50 extended by said annular hook 39. The peripheral bellows 50 provides the major part of the elastic deformation of said elastically deformable element.

All of the elements adjacent to and/or co-operating with the exhaust cone are made of metal.

In the example of FIGS. 1 and 2, the upstream edge 53 of the exhaust cone 23 is mounted simply to press against an outer collar of said adapter ring 27. The minimum radial clearance between the diameter of said collar (when cold) and the diameter of the upstream edge of the exhaust cone corresponds to the maximum travel that results from the difference in expansion between the two parts at the operating temperature.

In the example of FIG. 2, the elastically deformable element 37 is finished off by or forms a reentrant cover 55. The cover has an inside all 56 perpendicular to the axis X in the form of a disk, and a coaxial cylindrical portion 57. This portion is assembled to the elastically deformable element in the vicinity of the bellows 50. The inside wall 56 has a coaxial sleeve 58 that slides along a segment 59 of the axial rod 34, said segment being of corresponding diameter.

An annular band of the exhaust cone, adjacent to said cylindrical portion 57 of the reentrant cover, is provided with a plurality of holes 60. Advantageously, the disk 46 of the elastically deformable element that extends between the adjustment nut 42 and the bellows 50 is also provided with a plurality of holes 62.

This arrangement serves to limit the resonant vibrations known as "screech".

FIG. 4 shows a variant assembly between the upstream edge 53 of the exhaust cone 23 and the adapter ring. This assembly has tabs 64 that are deformable under the effect of temperature variations. In this example, the tabs are constituted by radial extensions of the adapter ring 27 that are folded under its assembly bolts. The upstream end portion of the exhaust cone 23 is crimped to said tabs.

In the variant of FIG. 5, the upstream edge 53 of the exhaust cone 23 is assembled to the adapter ring 27 via an annular bellows 66 that is deformable under the effect of temperature variations.

What is claimed is:

1. A channeling system for channeling an annular gas stream downstream from a turbine, the system comprising:

an exhaust cone defining the inside of said stream, said exhaust cone having an axis of symmetry that coincides with that of said stream, said exhaust cone is being made of composite material, an adapter ring, said exhaust cone extending downstream of said adapter ring, and an elastic stress device configured to act axially on said exhaust cone, and to urge said exhaust cone towards said adapter ring, wherein said exhaust cone has a downstream portion defining a circular downstream opening centered on the axis of symmetry, and wherein said elastic stress device comprises a support secured to said adapter ring, said support including an axial rod having its downstream end assembled to an elastically deformable element that is deformable axially, said elastically deformable element presenting an annular hook bearing against an edge of said circular opening.

2. A system according to claim 1, wherein said downstream end of said axial rod is provided with a threaded portion having an adjustment nut screwed thereon to co-operate with a central portion of said elastically deformable element to adjust an axial stress applied to said exhaust cone.

3. A system according to claim 2, wherein said elastically deformable element includes a disk with a central hole in which said threaded portion is engaged, and a peripheral bellows extended by said annular hook.

4. A system according to claim 1, wherein said elastically deformable element is made of metal.

5. A system according to claim 4, wherein a reentrant cover having a wall perpendicular to said axis and extended by a cylindrical portion is assembled to said elastically deformable element in the vicinity of said bellows, an annular band of said exhaust cone adjacent to said cylindrical portion being provided with a plurality of holes.

6. A system according to claim 4, wherein a wall of said elastically deformable element is pierced by holes.

7. A system according to claim 1, wherein an upstream edge of said exhaust cone is mounted to bear against a collar of said adapter ring.

8. A system according to claim 1, wherein an upstream edge of said exhaust cone is assembled to said adapter ring by a plurality of tabs.

9. A system according to claim 1, wherein an upstream edge of said exhaust cone is assembled to said adapter ring via an annular bellows.

10. A turbomachine, the turbomachine being fitted with a channeling system according to claim 1.

* * * * *